(12) United States Patent
Shibai et al.

(10) Patent No.: US 11,179,970 B2
(45) Date of Patent: Nov. 23, 2021

(54) PNEUMATIC TIRE

(71) Applicant: The Yokohama Rubber Co., LTD., Tokyo (JP)

(72) Inventors: Takashi Shibai, Hiratsuka (JP); Zenichiro Shida, Hiratsuka (JP)

(73) Assignee: The Yokohama Rubber Co., LTD.

( * ) Notice: Subject to any disclaimer, the term of this patent is extended or adjusted under 35 U.S.C. 154(b) by 189 days.

(21) Appl. No.: 16/333,213

(22) PCT Filed: Aug. 25, 2017

(86) PCT No.: PCT/JP2017/030479
§ 371 (c)(1),
(2) Date: Mar. 13, 2019

(87) PCT Pub. No.: WO2018/051763
PCT Pub. Date: Mar. 22, 2018

(65) Prior Publication Data
US 2019/0225020 A1 Jul. 25, 2019

(30) Foreign Application Priority Data

Sep. 16, 2016 (JP) .............................. JP2016-182190
Sep. 16, 2016 (JP) .............................. JP2016-182191

(51) Int. Cl.
*B60C 9/20* (2006.01)
*B60C 11/03* (2006.01)
(Continued)

(52) U.S. Cl.
CPC .............. *B60C 9/20* (2013.01); *B60C 9/2009* (2013.01); *B60C 11/0306* (2013.01);
(Continued)

(58) Field of Classification Search
CPC ................ B60C 2009/2025; B60C 2009/2271
See application file for complete search history.

(56) References Cited

U.S. PATENT DOCUMENTS

2011/0005652 A1    1/2011  Ono et al.

FOREIGN PATENT DOCUMENTS

| CN | 102015330 | 4/2011 |
|---|---|---|
| JP | H06-048111 | 2/1994 |

(Continued)

OTHER PUBLICATIONS

Translation of JP 2011-230538 (Year: 2011).*
International Search Report for International Application No. PCT/JP2017/030479 dated Sep. 19, 2017, 4 pages, Japan.

*Primary Examiner* — Marc C Howell
*Assistant Examiner* — John J DeRusso
(74) *Attorney, Agent, or Firm* — Thorpe North & Western

(57) ABSTRACT

A pneumatic tire includes a carcass layer and belt layers including belt cords inclined with respect to a circumferential direction, the belt cords of different layers being arranged in a criss-cross manner. In at least one belt layer, an inclination angle α of the belt cords with respect to the circumferential direction at a center position and an inclination angle β of the belt cords with respect to the circumferential direction at a belt end position satisfy $15° \leq \beta < \alpha \leq 35°$. A maximum ground contact length L1 and a ground contact length L2 satisfy $0.8 \leq L2/L1 \leq 1.0$, where L1 is the maximum ground contact length in the circumferential direction, W1 is a maximum ground contact width in a radial direction, and L2 is the ground contact length in the circumferential direction at a position 40% of W1 from the center position outward in a lateral direction.

15 Claims, 12 Drawing Sheets

(51) Int. Cl.
    *B60C 11/04*         (2006.01)
    *B60C 11/12*         (2006.01)
    *B60C 9/22*          (2006.01)

(52) U.S. Cl.
    CPC .......... *B60C 11/0332* (2013.01); *B60C 11/04* (2013.01); *B60C 11/1204* (2013.01); *B60C 11/1236* (2013.01); *B60C 2009/2016* (2013.01); *B60C 2009/2019* (2013.01); *B60C 2009/2025* (2013.01); *B60C 2009/2029* (2013.01); *B60C 2009/2032* (2013.01); *B60C 2009/229* (2013.01); *B60C 2009/2257* (2013.01); *B60C 2009/2271* (2013.01); *B60C 2009/2295* (2013.01); *B60C 2011/0344* (2013.01); *B60C 2011/0358* (2013.01); *B60C 2011/0383* (2013.01); *B60C 2200/04* (2013.01); *Y02T 10/86* (2013.01)

(56) References Cited

FOREIGN PATENT DOCUMENTS

| | | |
|---|---|---|
| JP | H06-048113 | 2/1994 |
| JP | 2003-154809 | 5/2003 |
| JP | 2005-075289 | 3/2005 |
| JP | 2006-256521 | 9/2006 |
| JP | 2009-119968 | 6/2009 |
| JP | 2011-230538 | 11/2011 |
| WO | WO 2009/107436 | 9/2009 |

\* cited by examiner

PNEUMATIC TIRE

TECHNICAL FIELD

The present technology relates to a pneumatic tire including a belt layer embedded in a tread portion and particularly relates to a pneumatic tire with reduced rolling resistance that can effectively suppress uneven wear in a shoulder region and a center region of a tread portion.

BACKGROUND ART

A pneumatic tire typically includes a carcass layer mounted between a pair of bead portions and a plurality of belt layers disposed outward of the carcass layer in the tire radial direction in a tread portion, wherein the plurality of belt layers each include a plurality of belt cords that are inclined with respect to the tire circumferential direction, and the plurality of belt cords of the different layers are disposed in a criss-cross manner.

Recently, there has been great demand for a pneumatic tire for a passenger vehicle with reduced rolling resistance. To satisfy this demand, tires have been designed such that the tread portion has a generally rectangular contact patch shape. A demerit of employing a rectangular contact patch shape is that uneven wear tends to occur more readily in a shoulder region of the tread portion. In light of this, technology to suppress the uneven wear in the shoulder region has been proposed in which belt cords of a belt layer have an inclination angle with respect to the tire circumferential direction that differs depending on the position in the tire lateral direction (for example, see Japan Unexamined Patent Publication No. 2011-230538). This increases rigidity in the tire circumferential direction of an end portion of the belt layer.

However, in the case of the structure of a belt layer increasing the rigidity in the tire circumferential direction of an end portion of the belt layer, contact patch length in a center region of a tread portion is relatively increased and uneven wear occurs more readily in the center region of the tread portion. This may cause the rolling resistance to be degraded. In this way, reducing rolling resistance and suppressing uneven wear in a shoulder region and a center region of a tread portion in a compatible manner is problematic.

SUMMARY

The present technology provides a pneumatic tire with reduced rolling resistance that can effectively suppress uneven wear in a shoulder region and a center region of a tread portion.

A pneumatic tire according to an embodiment of the present technology includes:

a carcass layer mounted between a pair of bead portions; and two belt layers disposed outward of the carcass layer in a tire radial direction in a tread portion, the two belt layers each including a plurality of belt cords inclined with respect to a tire circumferential direction, the plurality of belt cords of the different layers being arranged in a criss-cross manner; wherein in at least one of the two belt layers, an inclination angle $\alpha$ of the plurality of belt cords with respect to the tire circumferential direction at a tire center position and an inclination angle $\beta$ of the plurality of belt cords with respect to the tire circumferential direction at a belt end position satisfy a relationship $15° \leq \beta < \alpha \leq 35°$; and a maximum ground contact length $L1$ and a ground contact length $L2$ satisfy a relationship $0.8 \leq L2/L1 \leq 1.0$, where, with the pneumatic tire inflated to an air pressure of 240 kPa, loaded with a load 75% of standards-specified maximum load capacity, and brought into contact with a ground, $L1$ is the maximum ground contact length in the tire circumferential direction, $W1$ is a maximum ground contact width in the tire radial direction, and $L2$ is the ground contact length in the tire circumferential direction at a position 40% of the maximum ground contact width $W1$ from the tire center position outward in a tire lateral direction.

In an embodiment of the present technology, in the at least one belt layer, by employing a structure in which the inclination angle $\beta$ of the belt cords at the belt end position is smaller than the inclination angle $\alpha$ of the belt cords at the tire center position, uneven wear in the shoulder region of the tread portion can be suppressed. Also, the contact patch shape set in this manner in accordance with the ratio $L2/L1$ of the maximum ground contact length $L1$ and the ground contact length $L2$ in the shoulder region is given a generally rectangular shape. This allows uneven wear in the center region of the tread portion to be suppressed and prevents rolling resistance being degraded. As a result, the rolling resistance can be reduced and the uneven wear in the shoulder region and the center region of the tread portion can be effectively suppressed.

In an embodiment of the present technology, a difference between the inclination angle $\alpha$ and the inclination angle $\beta$ is preferably 3° or greater. This allows an effect of suppressing uneven wear in the shoulder region of the tread portion to be sufficiently produced.

Preferably, the at least one belt layer includes a centrally located large-angle region where an inclination angle of the plurality of belt cords is in a range $\alpha \pm 1°$ and a small-angle region on a shoulder side where an inclination angle of the plurality of belt cords is in a range $\beta \pm 1°$; and a width of the large-angle region is ½ or greater of an entire width of the at least one belt layer, and a width of the small-angle region is ⅛ or greater of the entire width of the at least one belt layer. By setting the centrally located large-angle region and small-angle region on the shoulder side of the belt layer as described above, the distribution of rigidity of the tread portion can be made appropriate. In another embodiment, the at least one belt layer includes a transition region between the large-angle region and the small-angle region, the transition region tolerating a change in angle of the plurality of belt cords.

The pneumatic tire according to an embodiment of the present technology, as a first reinforcement structure to appropriately set the contact patch shape, preferably further includes a belt reinforcing layer disposed outward of the at least one belt layer in the tire radial direction, the belt reinforcing layer being disposed covering the large-angle region of the at least one belt layer. In this embodiment, the belt reinforcing layer ends inward from the small-angle region of the belt layer in the tire lateral direction. In particular, two belt reinforcing layers are preferably provided. By disposing the belt reinforcing layer outward of the belt layer in the tire radial direction as described above, the contact patch shape is made appropriate. This allows uneven wear in the center region of the tread portion to be suppressed and rolling resistance to be prevented from degrading.

In the first reinforcement structure, the at least one belt layer preferably includes a transition region between the large-angle region and the small-angle region, the transition region tolerating a change in angle of the plurality of belt cords; and the belt reinforcing layer is preferably disposed covering the large-angle region and the transition region of the at least one belt layer. A large change in the angle of the belt cord can be tolerated by providing the transition region between the large-angle region and the small-angle region. However, disposing the belt reinforcing layer covering the transition region and the large-angle region allows distortion caused by the transition region to be alleviated and durability to be improved.

Additionally, in the first reinforcement structure, the two belt layers each preferably include a large-angle region and a small-angle region. This allows uneven wear in the shoulder region of the tread portion to be more effectively suppressed. In another embodiment, preferably, the two belt layers each include a transition region between the large-angle region and the small-angle region, the transition region tolerating a change in angle of the plurality of belt cords; and the transition region of the belt layer located inward and the transition region of the belt layer located outward are offset from one another in the tire lateral direction. By offsetting the transition regions of the inner belt layer and the transition regions of the outer belt layer from one another in this manner, localized distortion can be suppressed.

Additionally, in the first reinforcement structure, preferably, a plurality of main grooves extending in the tire circumferential direction are formed in the tread portion, the plurality of main grooves comprising at least one center main groove and a pair of shoulder main grooves located outward on either side of the center main groove; and the belt reinforcing layer extends outward in the tire lateral direction beyond the pair of shoulder main grooves, and a distance d in the tire lateral direction from an end position of the belt reinforcing layer to the corresponding shoulder main groove is 50% or greater of an opening width D of the corresponding shoulder main groove. When the end position of the belt reinforcing layer and the position of the shoulder main groove are located in the same position, cracking more readily occurs in the groove bottom of the shoulder main groove. Thus, by sufficiently separating the two, cracking in the groove bottom can be suppressed.

The pneumatic tire according to an embodiment of the present technology, as a second reinforcement structure to appropriately set the contact patch shape, preferably further includes a belt reinforcing layer disposed outward of the at least one belt layer in the tire radial direction, covering the at least one belt layer; and the rigidity of the belt reinforcing layer in the tire circumferential direction per unit width is higher in an inner region than an outer region in the tire lateral direction. By disposing the belt reinforcing layer outward of the belt layer in the tire radial direction as described above, the contact patch shape is made appropriate. This allows uneven wear in the center region of the tread portion to be suppressed and rolling resistance to be prevented from degrading.

In forming the second reinforcement structure, at least one of the structures described below is preferably employed. In the belt reinforcing layer, preferably, a cord count of band cords per unit width is greater in the inner region than in the outer region in the tire lateral direction. In the belt reinforcing layer, preferably, the band cords disposed in the inner region in the tire lateral direction have a higher rigidity than the band cords disposed in the outer region in the tire lateral direction. In the belt reinforcing layer, preferably, an inclination angle of band cords with respect to the tire circumferential direction ranges from 0° to 30°; and the inclination angle of the band cords with respect to the tire circumferential direction gradually increases from inward to outward in the tire lateral direction. By employing these structures, the rigidity in the tire circumferential direction per unit width of the belt reinforcing layer can be adjusted.

The pneumatic tire according to an embodiment of the present technology is a tire for a passenger vehicle with an aspect ratio of 65% or less. According to an embodiment of the present technology, rolling resistance can be reduced to levels demanded for a tire for a passenger vehicle and uneven wear in the shoulder region and the center region of the tread portion can be effectively suppressed.

In the present technology, the contact patch shape of the tread portion is measured when the tire is mounted on a regular rim and inflated to a predetermined air pressure, and placed vertically upon a flat surface with a predetermined load applied thereto. "Regular rim" is a rim defined by a standard for each tire according to a system of standards that includes standards on which tires are based, and refers to a "standard rim" in the case of JATMA (Japan Automobile Tyre Manufacturers Association, Inc.), refers to a "design rim" in the case of TRA (Tire and Rim Association, Inc.), and refers to a "measuring rim" in the case of ETRTO (European Tyre and Rim Technical Organisation). The air pressure is 240 kPa. The predetermined load is a load 75% of the maximum load capacity defined by a standard for each tire according to a system of standards that includes standards on which tires are based.

DETAILED DESCRIPTION

Figure 1:
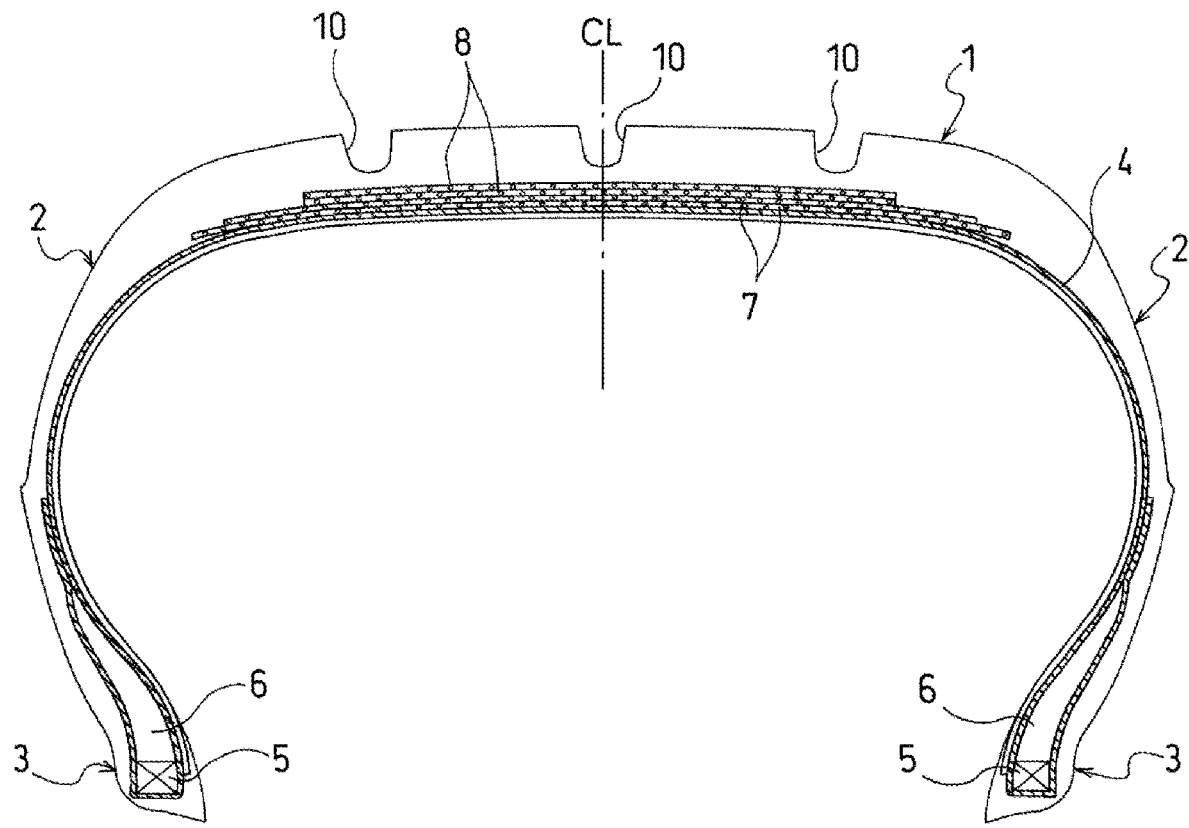
FIG. 1 is a meridian cross-sectional view illustrating a pneumatic tire according to an embodiment of the present technology.
Figure 2:
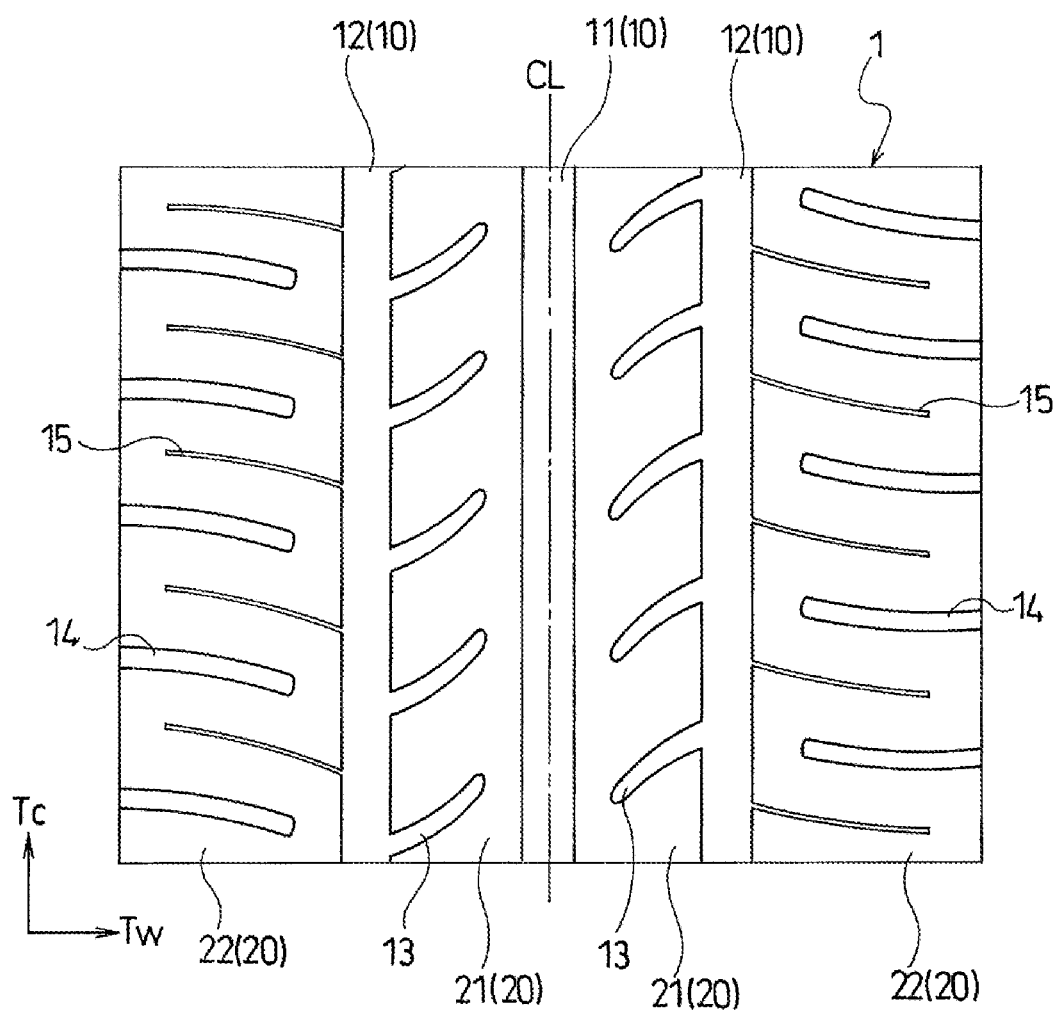
FIG. 2 is a developed view illustrating a tread pattern of the pneumatic tire of FIG. 1.
Figure 3:
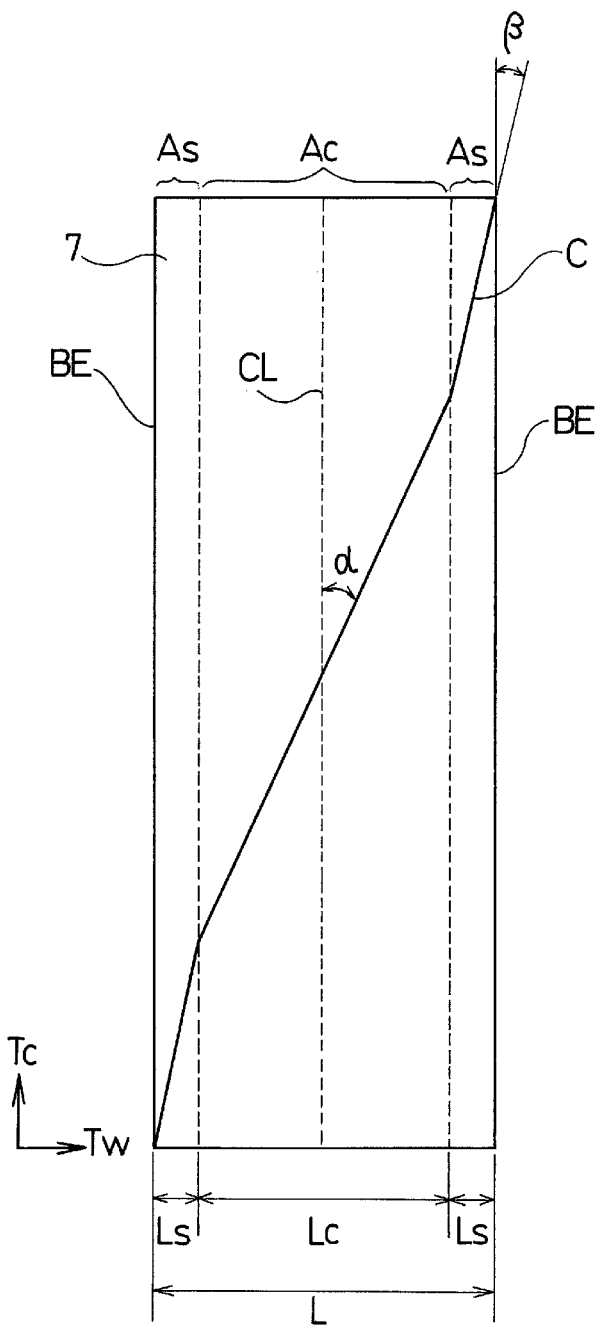
FIG. 3 is a developed view illustrating a belt layer of the pneumatic tire of FIG. 1.

Configurations of embodiments of the present technology are described in detail below with reference to the accompanying drawings. FIGS. 1 to 3 illustrate a pneumatic tire according to an embodiment of the present technology. In FIGS. 1 to 3, CL denotes the tire center position, Tc denotes the tire circumferential direction, and Tw denotes the tire lateral direction.

As illustrated in FIG. 1, a pneumatic tire of the present embodiment includes an annular tread portion 1 extending in the tire circumferential direction, a pair of sidewall portions 2, 2 disposed on both sides of the tread portion 1, and a pair of bead portions 3, 3 disposed inward of the sidewall portions 2 in the tire radial direction.

A carcass layer 4 is mounted between the pair of bead portions 3,3. The carcass layer 4 includes a plurality of carcass cords extending in the tire radial direction and is folded back around bead cores 5 disposed in each of the bead portions 3 from a tire inner side to a tire outer side. A bead filler 6 having a triangular cross-sectional shape formed from rubber composition is disposed on the outer circumference of the bead core 5.

A plurality of belt layers 7 are embedded on an outer circumferential side of the carcass layer 4 in the tread portion 1. The belt layers 7 each include a plurality of belt cords that are inclined with respect to the tire circumferential direction with belt cords of the different layers being arranged in a criss-cross manner. Steel cords are preferably used as the belt cords of the belt layers 7. A belt reinforcing layer 8, formed by arranging band cords at an angle of, for example, not greater than 5° with respect to the tire circumferential direction, is disposed on an outer circumferential side of the belt layers 7. The belt reinforcing layer 8 preferably has a jointless structure in which a strip material made from at least a single band cord laid out and covered with rubber is wound continuously in the tire circumferential direction. Nylon, aramid, or similar organic fiber cords are preferably used as the band cords of the belt reinforcing layer 8.

As illustrated in FIG. 2, a plurality of main grooves 10 extending in a tire circumferential direction are formed in a tread portion 1. The main grooves 10 include at least one center main groove 11 and a pair of shoulder main grooves 12, 12 located outward of the center main groove 11. A plurality of land portions 20 are defined in the tread portion 1 by the main grooves 10. The land portions 20 include center land portions 21 located between the pair of shoulder main groove 12, 12 and a shoulder land portion 22 located outward of each shoulder main groove 12. A plurality of terminating grooves 13 are formed in each of the center land portions 21. The terminating grooves 13 each include an end that opens to the shoulder main groove 12 and an end that terminates within the center land portion 21. Additionally, in each of the shoulder land portions 22, a plurality of lug grooves 14 that extend in the tire lateral direction without communicating with the shoulder main groove 12 and a plurality of sipes 15 that extend in the tire lateral direction and communicate with the shoulder main groove 12 are alternately formed in the tire circumferential direction.

As illustrated in FIG. 3, in the pneumatic tire described above, in at least one of the belt layers 7 and more preferably both, an inclination angle $\alpha$ of a belt cord C with respect to the tire circumferential direction at a tire center position CL and an inclination angle $\beta$ of the belt cord C with respect to the tire circumferential direction at a belt end position BE satisfy the relationship $15° \leq \beta < \alpha \leq 35°$.

By employing a structure in which the inclination angle $\beta$ of the belt cord C at the belt end position BE is smaller than the inclination angle $\alpha$ of the belt cord C at the tire center position CL, rigidity in the tire circumferential direction of the end portion of the belt layer 7 can be increased and uneven wear in the shoulder region of the tread portion 1 can be suppressed. In particular, by setting the difference between the inclination angle $\alpha$ and the inclination angle $\beta$ to 3° or greater, an effect of suppressing uneven wear in the shoulder region of the tread portion 1 can be sufficiently produced. When the inclination angle $\beta$ is less than 15°, the rigidity in the tire circumferential direction in the shoulder region of the tread portion 1 is excessive. When the inclination angle $\alpha$ is greater than 35°, the rigidity in the tire circumferential direction in the center region of the tread portion 1 is too low, causing the ground contact length in the center region to be excessively long.

As illustrated in FIG. 3, the belt layer 7 preferably includes a centrally located large-angle region Ac where the inclination angle of the belt cord C is in the range $\alpha \pm 1°$ and small-angle regions As on the shoulder sides where the inclination angle of the belt cord C is in the range $\beta \pm 1°$. Also, preferably, a width Lc of the large-angle region Ac is ½ or greater of an entire width L of the belt layer 7, and a width Ls of the small-angle regions As is ⅛ or greater of the entire width L of the belt layer 7. By setting the centrally located large-angle region Ac and small-angle regions As on the shoulder sides of the belt layer 7 as described above, the distribution of the rigidity of the tread portion can be made appropriate. When the width Lc of the large-angle region Ac is less than ½ of the entire width L of the belt layer 7, the function as a belt layer 7 is reduced. When the width Ls of the small-angle region As is less than ⅛ of the entire width L of the belt layer 7, the rigidity in the tire circumferential direction in the shoulder region of the tread portion 1 cannot be sufficiently increased. Note that the width Lc of the large-angle region Ac and the width Ls of the small-angle region As are set in accordance with the entire width L of the belt layers 7.

Figure 4:
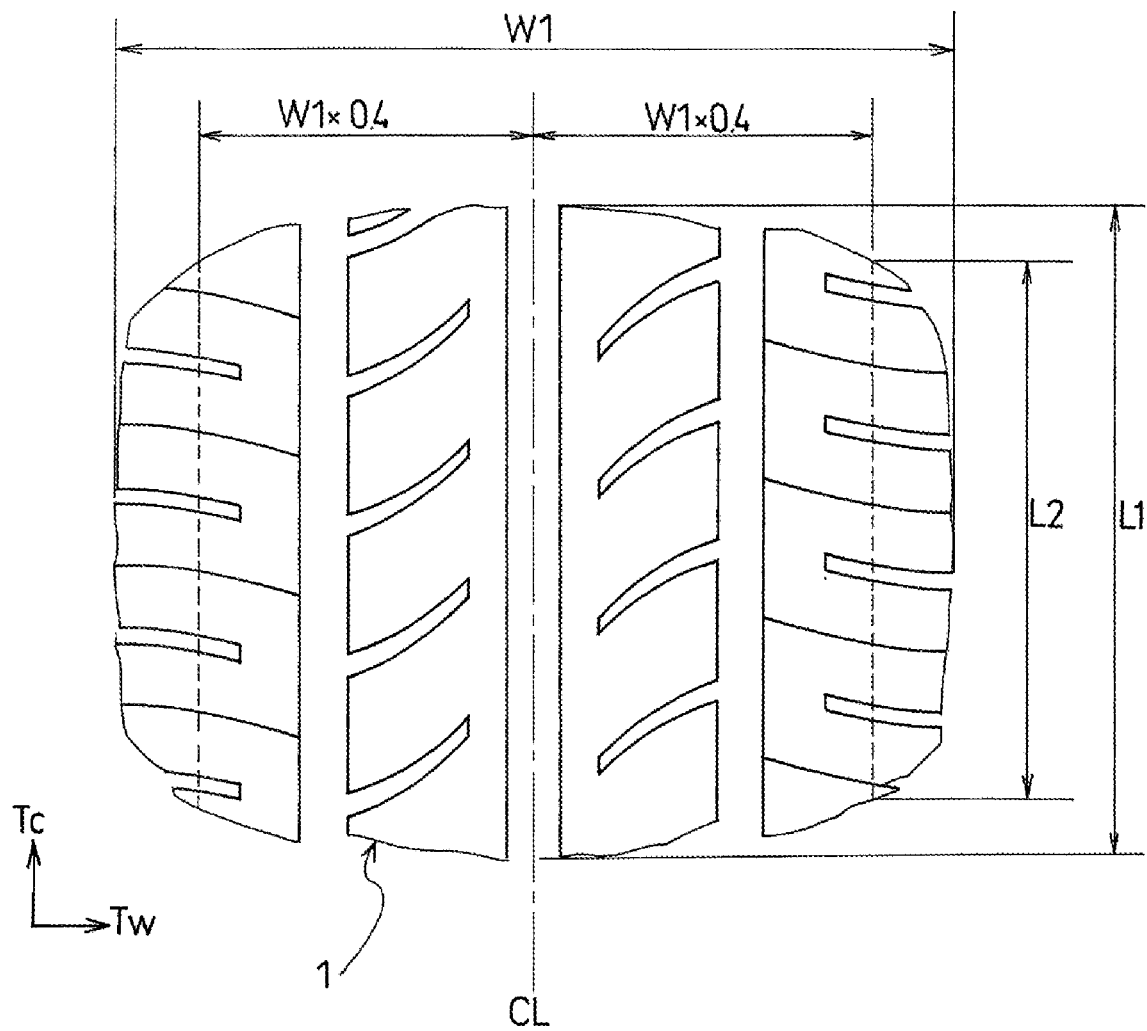
FIG. 4 is a plan view illustrating a contact patch shape of the pneumatic tire of FIG. 1.

FIG. 4 is a drawing illustrating the contact patch shape of the pneumatic tire of FIG. 1. When the above-described pneumatic tire is inflated to an air pressure of 240 kPa, loaded with a load 75% of the standards-specified maximum load capacity, and brought into contact with the ground, the maximum ground contact length in the tire circumferential direction is L1, the maximum ground contact width in the tire lateral direction is W1, and the ground contact length in the tire circumferential direction at a position 40% of the maximum ground contact width W1 from the tire center position outward in the tire lateral direction is L2. In the pneumatic tire, the maximum ground contact length L1 and the ground contact length L2 have a relationship satisfying $0.8 \leq L2/L1 \leq 1.0$ and more preferably satisfying $0.85 \leq L2/L1 \leq 0.95$.

The contact patch shape set in this manner in accordance with the ratio L2/L1 of the maximum ground contact length L1 and the ground contact length L2 in the shoulder region is given a generally rectangular shape. This allows uneven wear in the center region of the tread portion 1 to be suppressed and prevents rolling resistance from being degraded. As a result, rolling resistance can be reduced and uneven wear in the shoulder region and the center region of the tread portion 1 can be effectively suppressed. When the ratio L2/L1 is less than 0.8, uneven wear in the center region of the tread portion 1 cannot be sufficiently suppressed and rolling resistance may be degraded. When the ratio L2/L1 is greater than 1.0, uneven wear may occur in the shoulder region of the tread portion 1.

To appropriately set the ratio L2/L1 (rectangular ratio) of the maximum ground contact length L1 and the ground contact length L2 as described above, the pneumatic tire is provided with a belt reinforcing layer 8 disposed outward of the belt layer 7 in the tire radial direction, and the belt reinforcing layer 8 is disposed locally covering the large-angle region Ac of the belt layer 7. By disposing the belt reinforcing layer 8 outward of the belt layer 7 in the tire radial direction in this manner, the ground contact length of the center region of the tread portion 1 is suppressed from being excessive and the contact patch shape is made appropriate. This allows uneven wear in the center region of the tread portion 1 to be suppressed and rolling resistance to be prevented from degrading. This effect can be significantly obtained by disposing two or more belt reinforcing layers 8 on top on one another, locally covering the large-angle region Ac of the belt layer 7.

Figure 5:
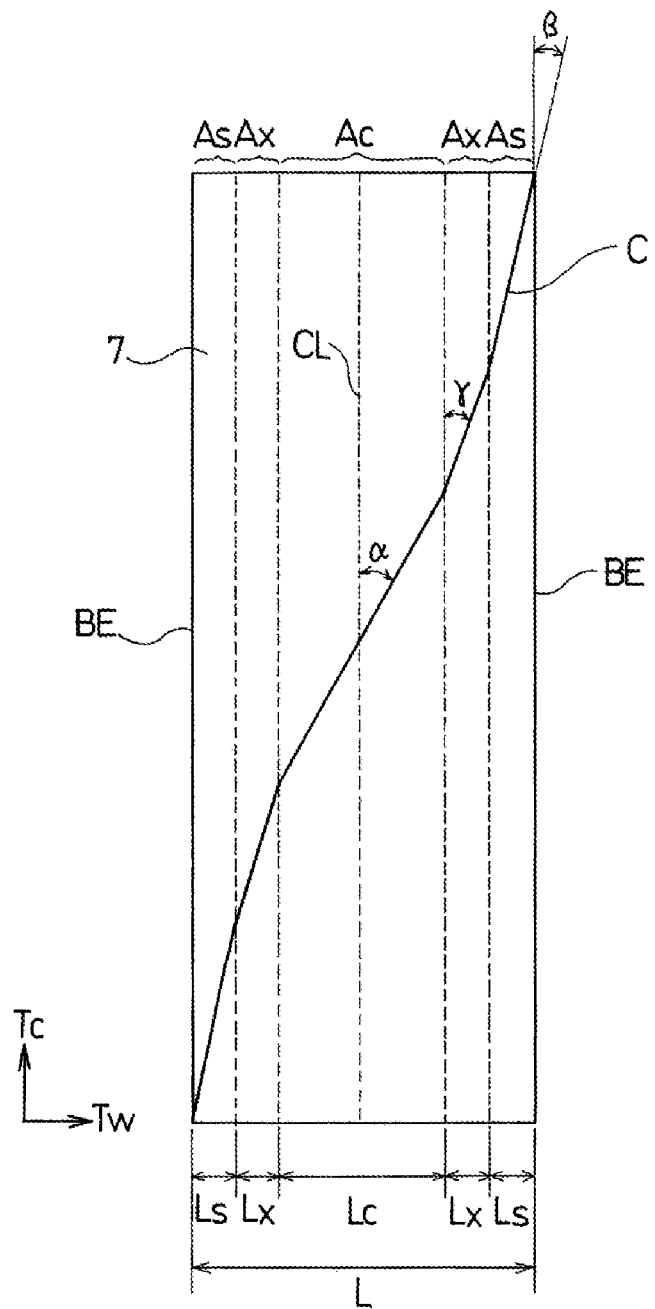
FIG. 5 is a developed view illustrating a belt layer according to a modified example of the pneumatic tire of FIG. 1.

FIG. 5 is a drawing illustrating a belt layer according to a modified example of the pneumatic tire of FIG. 1. In FIG. 5, the belt layer 7 includes a transition region Ax located between the centrally located large-angle region Ac and the small-angle regions As on the shoulder sides. In the transition region Ax, a change in angle of the belt cord C is tolerated. By disposing the transition regions Ax between the large-angle region Ac and the small-angle regions As, a large change in angle of the belt cord C can be tolerated. However, the transition region Ax may cause distortion to occur at the tread portion 1. Thus, the belt reinforcing layer 8 is preferably disposed locally covering the large-angle region Ac and the transition region Ax of the belt layer 7. By covering the transition region Ax and the large-angle region Ac with the belt reinforcing layer 8, distortion caused by the transition region Ax can be alleviated and durability can be improved.

As described above, the width Lc of the large-angle region Ac is ½ or greater of the entire width L of the belt layer 7, and the width Ls of the small-angle region As is ⅛ or greater of the entire width L of the belt layer 7. Accordingly, a width Lx of the transition region Ax disposed between the large-angle region Ac and the small-angle region As is ⅛ or less of the entire width L of the belt layer 7. Additionally, an inclination angle γ of the belt cord C with respect to the tire circumferential direction in the transition region Ax, together with the inclination angles α, β, satisfies the relationship β<γ<α.

In the pneumatic tire, the two belt layers 7 each preferably include the centrally located large-angle region Ac and the small-angle regions As on the shoulder sides. In this configuration, the rigidity of the tread portion 1 is appropriately set in accordance with the two belt layers 7. This allows uneven wear in the shoulder regions of the tread portion 1 to be more effectively suppressed.

Figure 6:
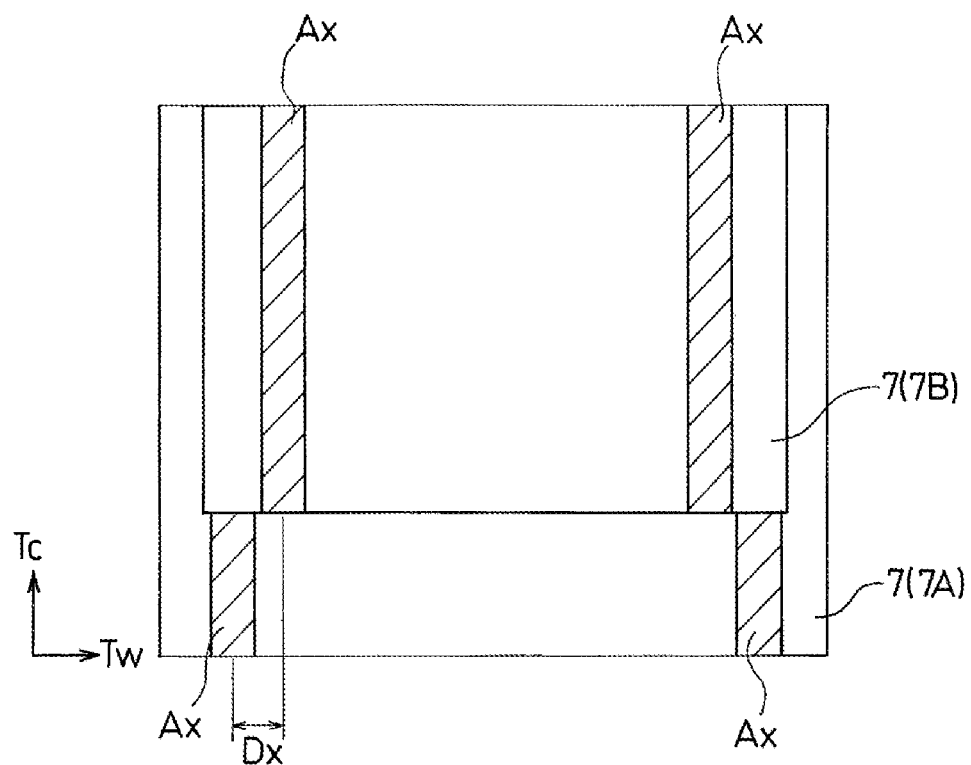
FIG. 6 is a developed view illustrating a belt layer according to another modified example of the pneumatic tire of FIG. 1.

FIG. 6 is a drawing illustrating a belt layer according to another modified example of the pneumatic tire of FIG. 1. As illustrated in FIG. 6, in both of the belt layers 7, the transition regions Ax, in which a change in angle of the belt cord C is tolerated, are disposed between the large-angle region Ac and the small-angle regions As. In this example, the transition regions Ax (hatched portion) of the belt layer 7A located inward in the tire radial direction and the transition regions Ax of the belt layer 7B located outward in the tire radial direction are preferably offset from one another in the tire lateral direction. By offsetting the transition regions Ax of the inner belt layer 7A and the transition regions Ax of the outer belt layer 7B from one another in this manner, localized distortion can be suppressed. Note that an offset amount Dx from the center positions of the transition region Ax of the belt layer 7A and the transition region Ax of the belt layer 7B is preferably 3 mm or greater.

Figure 7:
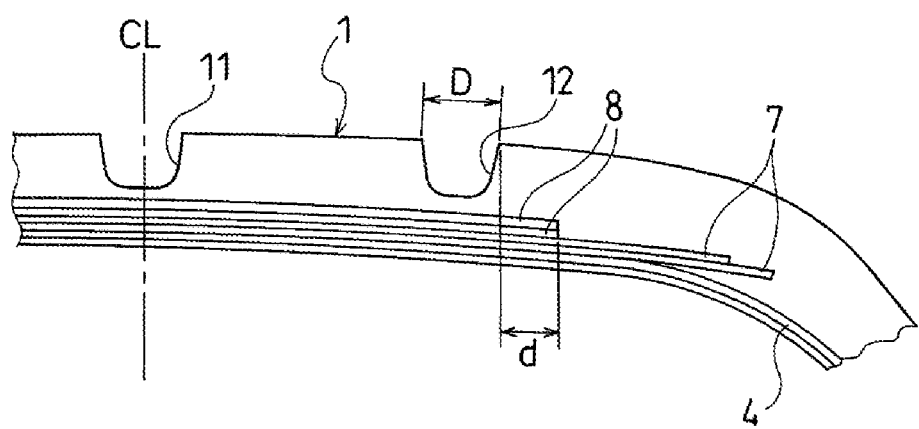
FIG. 7 is a cross-sectional view illustrating the tread portion of the pneumatic tire of FIG. 1.

FIG. 7 illustrates the tread portion of the pneumatic tire according to the embodiment illustrated in FIG. 1. As illustrated in FIG. 7, the plurality of main grooves 10 extending in the tire circumferential direction are formed in the tread portion 1, and the plurality of main grooves 10 include the at least one center main groove 11 and the pair of shoulder main grooves 12 located outward on either side of the center main groove 11. In this configuration, preferably, the belt reinforcing layer 8 extends outward in the tire lateral direction beyond the shoulder main grooves 12, and a distance d in the tire lateral direction from an end position of the belt reinforcing layer 8 to the corresponding shoulder main groove 12 is 50% or greater of an opening width D of the shoulder main groove 12. When the end position of the belt reinforcing layer 8 and the position of the shoulder main groove 12 are located in the same position, cracking more readily occurs in the groove bottom of the shoulder main groove 12. Thus by sufficiently separating the two, cracking in the groove bottom can be suppressed.

Figure 8:
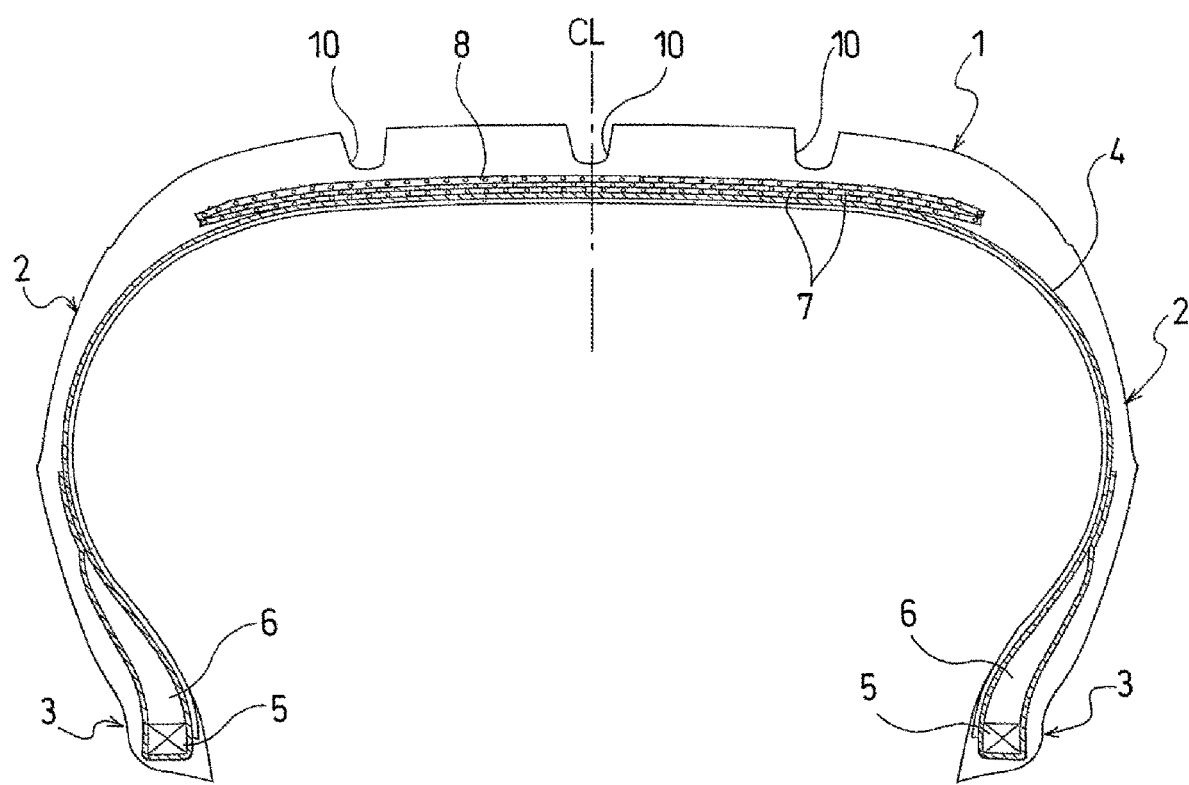
FIG. 8 is a meridian cross-sectional view illustrating a pneumatic tire according to another embodiment of the present technology.

FIG. 8 illustrates a pneumatic tire according to another embodiment of the present technology. In the present embodiment, the structure of the belt reinforcing layer 8 is the only difference from the embodiments described above. In other words, the pneumatic tire of the present embodiment includes a tire internal structure like that illustrated in FIG. 8 and a tread pattern such as that illustrated in FIG. 2. Additionally, in the pneumatic tire of the present embodiment, the belt layers 7 embedded in the tread portion 1 have a structure such as that illustrated in FIG. 3 or FIG. 5. Furthermore, the pneumatic tire of the present embodiment has a contact patch shape like that illustrated in FIG. 4. A description of structures which are the same as those of the embodiments described above will be omitted.

As described above, so that the ratio L2/L1 (rectangular ratio) of the maximum ground contact length L1 and the ground contact length L2 satisfies the relationship $0.8 \leq L2/L1 \leq 1.0$ and more preferably the relationship $0.85 \leq L2/L1 \leq 0.95$, in the pneumatic tire, the belt reinforcing layer 8 is disposed covering all of the belt layer 7 in the tire lateral direction and rigidity in the tire circumferential direction per unit width is set higher in the inner region in the tire lateral direction than in the outer region. In other words, by appropriately setting a cross-sectional area S ($mm^2$) of the band cord of the belt reinforcing layer 8, an elastic modulus E ($kN/mm^2$) of the band cord, the cord count N (cords/50 mm) of the band cords per 50 mm width of the belt reinforcing layer 8, and an inclination angle θ (°) of the band cord with respect to the tire circumferential direction, a rigidity G (kN/50 mm) in the tire circumferential direction per unit width of the belt reinforcing layer 8 is adjusted depending on the position in the tire lateral direction. The rigidity G in the tire circumferential direction per unit width of the belt reinforcing layer 8 is, for example, calculated via $G = S \times E \times N \times \cos^4 \theta$. The rigidity G per unit width of the belt reinforcing layer 8 in the outer region in the tire lateral direction preferably ranges from 15 kN/50 mm to 30 kN/50 mm, and the rigidity Gin the inner region in the tire lateral direction is preferably higher.

Figure 9:
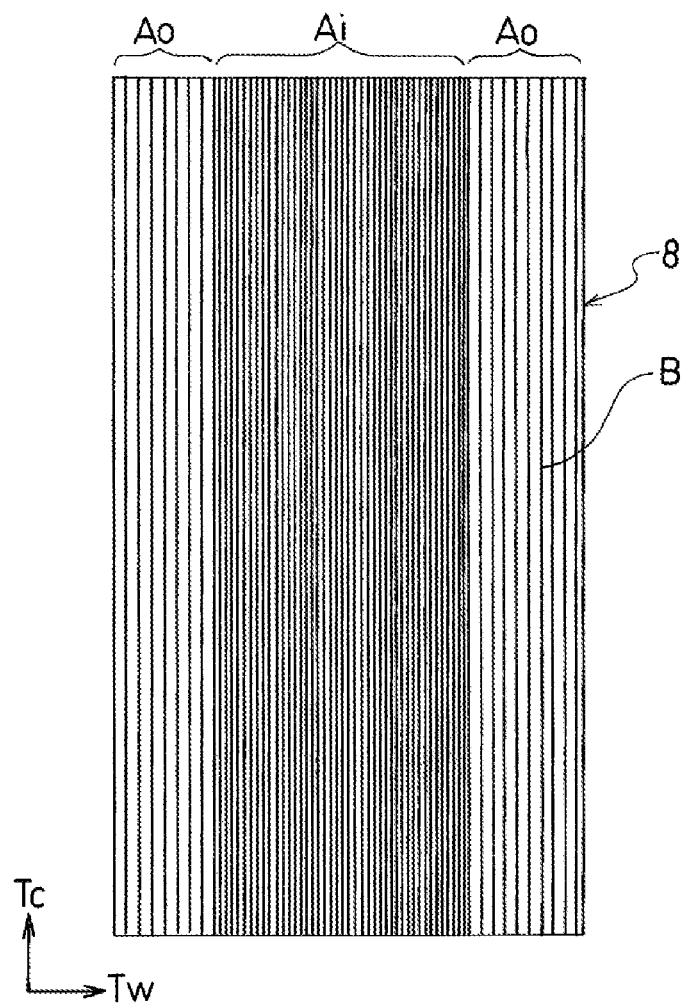
FIG. 9 is a developed view illustrating a belt reinforcing layer of the pneumatic tire of FIG. 8.

FIG. 9 is a drawing illustrating the belt reinforcing layer of the pneumatic tire of FIG. 8. As illustrated in FIG. 9, the belt reinforcing layer 8 is defined into outer regions Ao and an inner region Ai in the tire lateral direction. The cord count N of the band cords B per unit width is greater in the inner region Ai than in the outer regions Ao. In this manner, the ground contact length of the center region of the tread portion 1 is suppressed from being excessive and the contact patch shape is made appropriate. This allows uneven wear in the center region of the tread portion 1 to be suppressed and rolling resistance to be prevented from degrading.

Figure 10:
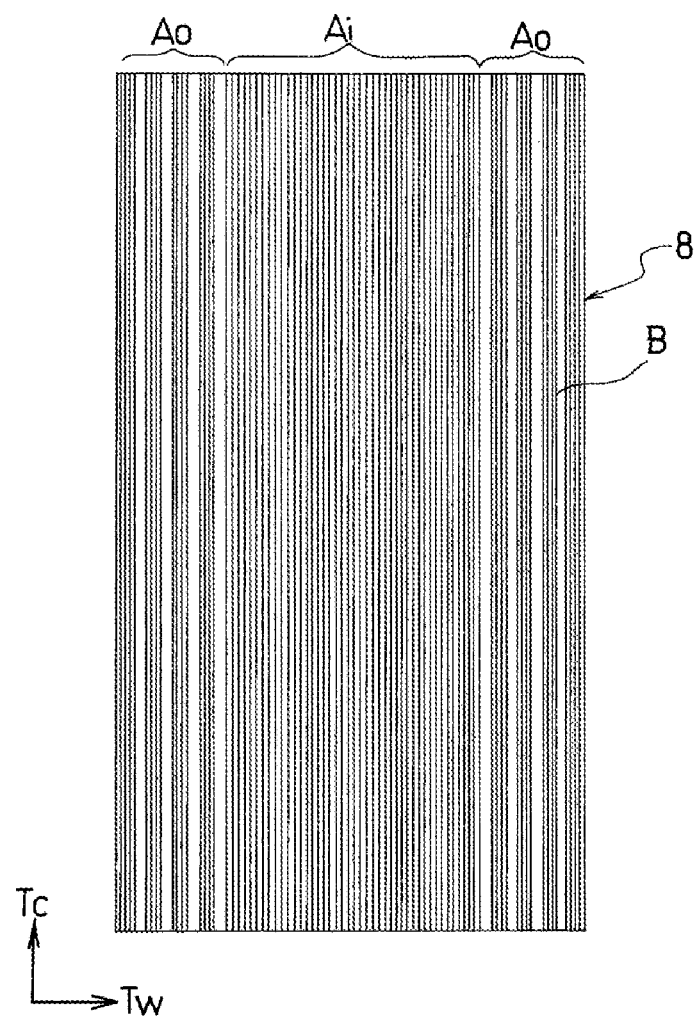
FIG. 10 is a developed view illustrating a belt reinforcing layer according to a modified example of the pneumatic tire of FIG. 8.

FIG. 10 is a drawing illustrating a belt reinforcing layer according to a modified example of the pneumatic tire of FIG. 8. In the FIG. 10, the belt reinforcing layer 8 has a jointless structure in which a strip material made from a plurality of band cords B laid out and covered with rubber is wound continuously in the tire circumferential direction. In the inner region Ai, the strip material is densely wound close together, and in the outer region Ao, the strip material is sparsely wound spaced apart from itself. In an example in which the width of the strip material is 10 mm, the spacing of the strip material in the outer region Ao ranges from 2 mm to 5 mm. As a result, the cord count N of the band cords B per unit width of the belt reinforcing layer 8 is greater in the inner region Ai than in the outer regions Ao. In this manner, the ground contact length of the center region of the tread portion 1 is suppressed from being excessive and the contact patch shape is made appropriate. This allows uneven wear in the center region of the tread portion 1 to be suppressed and the rolling resistance to be prevented from degrading.

Figure 11:
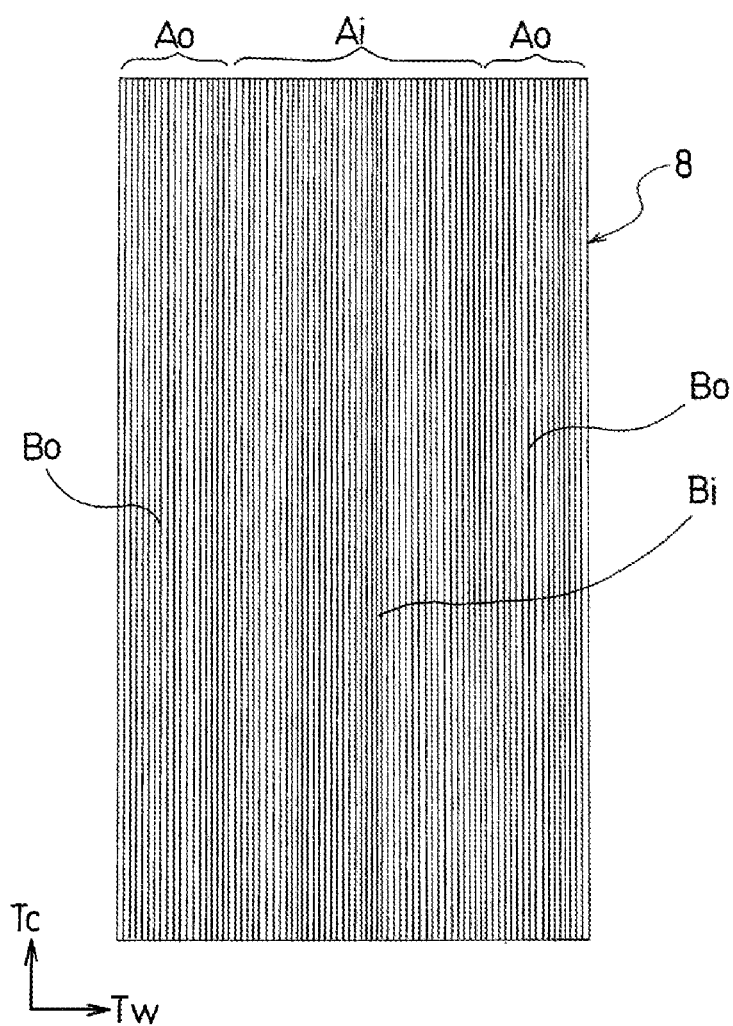
FIG. 11 is a developed view illustrating a belt reinforcing layer according to another modified example of the pneumatic tire of FIG. 8.

FIG. 11 is a drawing illustrating a belt reinforcing layer according to yet another modified example of the pneumatic tire of FIG. 8. In FIG. 11, the band cords B of the belt reinforcing layer are disposed at equal intervals in the entire region. However, as the material of the band cords B, two different types of band cords Bi, Bo are used. That is, the band cord Bo is disposed in the outer region Ao of the belt reinforcing layer 8, and the band cord Bi is disposed in the inner region Ai. The tensile rigidity of the band cord Bi is greater than the tensile rigidity of the band cord Bo. In this manner, the ground contact length of the center region of the tread portion 1 is suppressed from being excessive and the contact patch shape is made appropriate. This allows uneven wear in the center region of the tread portion 1 to be suppressed and rolling resistance to be prevented from degrading. As the band cord Bi of the inner region Ai, for example, a hybrid cord of nylon and aramid is used, and as the band cord Bo of the outer region Ao, a nylon cord is used. A tape-shaped synthetic resin sheet may also be used as the band cord B.

In the embodiments described above, the inner region Ai of the belt reinforcing layer 8 with relatively high rigidity is preferably disposed covering the large-angle region Ac of the belt layer 7. In an embodiment in which the belt layer 7 includes a transition region Ax between a large-angle region Ac and small-angle region As, the inner region Ai of the belt reinforcing layer 8 with the relatively high rigidity can be disposed across the transition region Ax of the belt layer 7.

Figure 12:
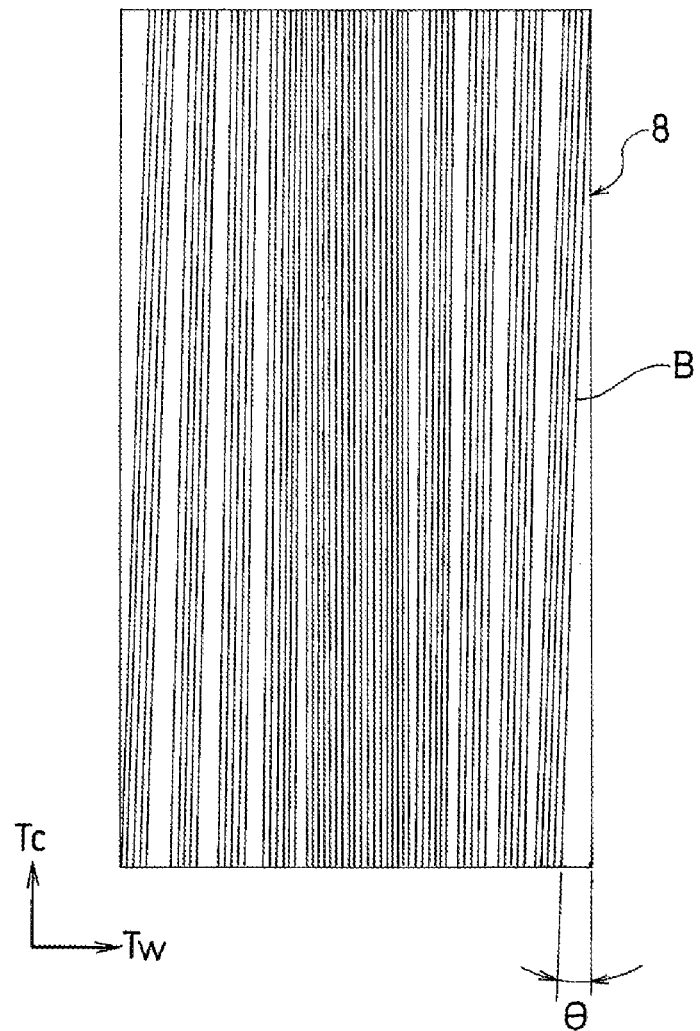
FIG. 12 is a developed view illustrating a belt reinforcing layer according to yet another modified example of the pneumatic tire of FIG. 8.

FIG. 12 is a drawing illustrating a belt reinforcing layer according to yet another modified example of the pneumatic tire of FIG. 8. As illustrated in FIG. 12, in the belt reinforcing layer 8, the inclination angle $\theta$ of the band cord B with respect to the tire circumferential direction ranges from 0° to 30°, and the inclination angle $\theta$ of the band cord B with respect to the tire circumferential direction gradually increases from inward to outward in the tire lateral direction. In this manner, the ground contact length of the center region of the tread portion 1 is suppressed from being excessive and the contact patch shape is made appropriate. This allows uneven wear in the center region of the tread portion 1 to be suppressed and rolling resistance to be prevented from degrading. The belt layer 7 includes a small-angle region As on the shoulder side, and in the corresponding region, the rigidity of the belt cover layer 8 in the tire circumferential direction can be set lower without a substantial effect on durability. However, when the inclination angle $\theta$ of the band cord B with respect to the tire circumferential direction is greater than 30°, high-speed durability can be adversely effected.

A preferred embodiment of the pneumatic tire described above is a tire for a passenger vehicle with an aspect ratio of 65% or less. Such a tire for a passenger vehicle can achieve reduced rolling resistance and enhanced uneven wear resistance.

EXAMPLES

Pneumatic tires according to Conventional Example 1, Comparative Example 1, and Examples 1 to 7 were manufactured with a tire size of 205/55R16 91V and including a carcass layer mounted between a pair of bead portions, two belt layers disposed outward of the carcass layer in the tire radial direction in the tread portion, and a belt reinforcing layer disposed outward of the two belt layers in the tire radial direction. The belt layer structure, the belt reinforcing layer structure, and the rectangular ratio of the contact patch shape were set as indicated in Table 1.

In Conventional Example 1, a typical belt layer in which the inclination angle $\alpha$ of the belt cord with respect to the tire circumferential direction at the tire center position and inclination angle $\beta$ of the belt cord with respect to the tire circumferential direction at the belt end position are identical was used, as well as a belt reinforcing layer (full cover) that covers all of the belt layer.

In Comparative Example 1, a belt layer including a large-angle region, a transition region, and a small-angle region and having an inclination angle $\beta$ of the belt cord with respect to the tire circumferential direction at the belt end position being less than the inclination angle $\alpha$ of the belt cord with respect to the tire circumferential direction at the tire center position was used, as well as a belt reinforcing layer (full cover+edge cover) that covers all of the belt layer.

In Example 1, a belt layer including a large-angle region, a transition region, and a small-angle region and having an inclination angle $\beta$ of the belt cord with respect to the tire circumferential direction at the belt end position being less than the inclination angle $\alpha$ of the belt cord with respect to the tire circumferential direction at the tire center position was used, as well as a belt reinforcing layer (full cover) that covers all of the belt layer. In Examples 2 to 6, a belt layer including a large-angle region, a transition region, and a small-angle region and having an inclination angle $\beta$ of the belt cord with respect to the tire circumferential direction at the belt end position being less than the inclination angle $\alpha$ of the belt cord with respect to the tire circumferential direction at the tire center position was used, as well as a belt reinforcing layer (center cover) that locally covers the large-angle region of the belt layer (or a region including the large-angle region and the transition region).

In Table 1, the boundary position between the large-angle region and the transition region of the belt layers, the boundary position between the transition region and the small-angle region, and the outer end position are indicated as distances from the tire center position in the tire lateral direction. In a similar manner, the outer end position of the belt reinforcing layer is indicated as a distance from the tire center position in the tire lateral direction. Additionally, the rectangular ratio of the contact patch shape is calculated by L2/L1×100%, where the maximum ground contact length in the tire circumferential direction is L1, the maximum ground contact width in the tire lateral direction is W1, and the ground contact length in the tire circumferential direction at a position 40% of the maximum ground contact width W1 from a tire center position outward in the tire lateral direction is L2, when the pneumatic tire is inflated to an air pressure of 240 kPa, loaded with a load 75% of the standards-specified maximum load capacity, and brought into contact with the ground.

The test tires were evaluated for uneven wear resistance (shoulder region, center region) and rolling resistance according to the following evaluation method, and the results are shown in Table 1.

Uneven Wear Resistance (Shoulder Region, Center Region):

The test tires were each mounted on a wheel with a 16×6.5 J rim size and then on a friction energy measuring tester. The average friction energy was measured for the shoulder region and the center region of the tread portion at an air pressure of 230 kPa and a load of 4.5 kN. The measurement value for each region was the average friction energy measured at four locations, two locations 10 mm apart in the tire lateral direction and two locations 10 mm apart in the tire circumferential direction. For the evaluation result for the uneven wear resistance in the shoulder region, the reciprocals of the measurement values are expressed as index values with Conventional Example 1 being assigned the index value of 100, and for the uneven wear resistance in the center region, the reciprocals of the measurement values are expressed as index values with Comparative Example 1 being assigned the index value of 100. Larger index values indicate superior uneven wear resistance.

Rolling Resistance:

The test tires were each mounted on a wheel with a 16×6.5 J rim size and then on a drum testing machine. The rolling resistance was measured in accordance with ISO (International Standards Organization) 25280 at an air pressure of 210 kPa and a load of 4.82 kN. The evaluation results are expressed as index values using the reciprocal of the measurement values, with Comparative Example 1 being assigned the index value of 100. Higher index values indicate lower rolling resistance.

TABLE 1

|  |  | Conventional Example 1 | Comparative Example 1 | Example 1 | Example 2 |
|---|---|---|---|---|---|
| Inclination angle α of belt cord at tire center position (°) | | 26 | 26 | 26 | 26 |
| Inclination angle β of belt cord at belt end position (°) | | 26 | 18 | 18 | 24.5 |
| Outer belt layer | Boundary position between large-angle region and transition region (mm) | — | 45 | 45 | 45 |
|  | Boundary position between transition region and small-angle region (mm) | — | 53 | 53 | 53 |
|  | Outer end position (mm) | 80 | 80 | 80 | 80 |
| Inner belt layer | Boundary position between large-angle region and transition region (mm) | — | 45 | 45 | 45 |
|  | Boundary position between transition region and small-angle region (mm) | — | 53 | 53 | 53 |
|  | Outer end position (mm) | 85 | 85 | 85 | 85 |
| Outer end position of belt reinforcing layer (mm) | | 85 | 85 | 85 | 45 |
| Number of belt reinforcing layers above large-angle region | | (1) | 1 | 1 | 1 |
| Number of belt reinforcing layers above transition region | | (1) | 1 | 1 | 0 |
| Number of belt reinforcing layers above small-angle region | | (1) | 2 | 1 | 0 |
| Rectangular ratio of contact patch shape (%) | | 90 | 75 | 80 | 88 |
| Uneven wear resistance in shoulder region (index value) | | 100 | 120 | 120 | 110 |
| Uneven wear resistance in center region (index value) | | 125 | 100 | 110 | 120 |
| Rolling resistance (index value) | | 120 | 100 | 105 | 120 |

|  |  | Example 3 | Example 4 | Example 5 | Example 6 | Example 7 |
|---|---|---|---|---|---|---|
| Inclination angle α of belt cord at tire center position (°) | | 26 | 26 | 26 | 26 | 26 |
| Inclination angle β of belt cord at belt end position (°) | | 23 | 18 | 18 | 18 | 18 |
| Outer belt layer | Boundary position between large-angle region and transition region (mm) | 45 | 45 | 45 | 45 | 45 |
|  | Boundary position between transition region and small- | 53 | 53 | 53 | 53 | 53 |

TABLE 1-continued

|  |  | | | | | |
|---|---|---|---|---|---|---|
|  | angle region (mm) | | | | | |
|  | Outer end position (mm) | 80 | 80 | 80 | 80 | 80 |
| Inner belt layer | Boundary position between large-angle region and transition region (mm) | 45 | 45 | 45 | 45 | 50 |
|  | Boundary position between transition region and small-angle region (mm) | 53 | 53 | 53 | 53 | 58 |
|  | Outer end position (mm) | 85 | 85 | 85 | 85 | 85 |
| Outer end position of belt reinforcing layer (mm) | | 45 | 45 | 45 | 53 | 58 |
| Number of belt reinforcing layers above large-angle region | | 1 | 1 | 2 | 2 | 2 |
| Number of belt reinforcing layers above transition region | | 0 | 0 | 0 | 2 | 2 |
| Number of belt reinforcing layers above small-angle region | | 0 | 0 | 0 | 0 | 0 |
| Rectangular ratio of contact patch shape (%) | | 85 | 85 | 90 | 90 | 90 |
| Uneven wear resistance in shoulder region (index value) | | 115 | 120 | 120 | 120 | 120 |
| Uneven wear resistance in center region (index value) | | 120 | 115 | 125 | 125 | 125 |
| Rolling resistance (index value) | | 120 | 115 | 120 | 120 | 120 |

As can be seen from Table 1, the tires of Examples 1 to 7 have excellent uneven wear resistance in the shoulder region compared to Conventional Example 1. Also, the tires of Examples 1 to 7 have excellent uneven wear resistance in the center region and good rolling resistance compared to Comparative Example 1.

Next, pneumatic tires according to Conventional Example 11, Comparative Example 11, and Examples 11 to 17 were manufactured with a tire size of 205/55R16 91V and including a carcass layer mounted between a pair of bead portions, two belt layers disposed outward of the carcass layer in the tire radial direction in the tread portion, and a belt reinforcing layer disposed outward of the two belt layers in the tire radial direction. The belt layer structure, the belt reinforcing layer structure, and the rectangular ratio of the contact patch shape were set as indicated in Table 2.

In Conventional Example 11, a typical belt layer in which the inclination angle α of the belt cord with respect to the tire circumferential direction at the tire center position and inclination angle β of the belt cord with respect to the tire circumferential direction at the belt end position are identical was used, as well as a belt reinforcing layer (full cover) that covered all of the belt layer.

In Comparative Example 11, a belt layer including a large-angle region, a transition region, and a small-angle region and having an inclination angle β of the belt cord with respect to the tire circumferential direction at the belt end position being less than the inclination angle α of the belt cord with respect to the tire circumferential direction at the tire center position was used, as well as a belt reinforcing layer (full cover) that covered all of the belt layer.

In Examples 11 to 17, a belt layer including a large-angle region, a transition region, and a small-angle region and having an inclination angle β of the belt cord with respect to the tire circumferential direction at the belt end position being less than the inclination angle α of the belt cord with respect to the tire circumferential direction at the tire center position was used, as well as a belt reinforcing layer (FIGS. 9 to 12) that covered all of the belt layer.

In Table 2, the boundary position between the large-angle region and the transition region of the belt layers, the boundary position between the transition region and the small-angle region, and the outer end position are indicated as distances from the tire center position in the tire lateral direction. Additionally, the rectangular ratio of the contact patch shape is calculated by L2/L1×100%, where the maximum ground contact length in the tire circumferential direction is L1, the maximum ground contact width in the tire lateral direction is W1, and the ground contact length in the tire circumferential direction at a position 40% of the maximum ground contact width W1 from a tire center position outward in the tire lateral direction is L2, when the pneumatic tire is inflated to an air pressure of 240 kPa, loaded with a load 75% of the standards-specified maximum load capacity, and brought into contact with the ground.

The test tires were evaluated for uneven wear resistance (shoulder region, center region) and rolling resistance according to the following evaluation method, and the results are shown in Table 2.

Uneven Wear Resistance (Shoulder Region, Center Region):

The test tires were each mounted on a wheel with a 16×6.5 J rim size and then on a friction energy measuring tester. The average friction energy was measured for the shoulder region and the center region of the tread portion at an air pressure of 230 kPa and a load of 4.5 kN. The measurement value for each region was the average friction energy measured at four locations, two locations 10 mm apart in the tire lateral direction and two locations 10 mm apart in the tire circumferential direction. For the evaluation result for the uneven wear resistance in the shoulder region, the reciprocals of the measurement values are expressed as index values with Conventional Example 11 being assigned the index value of 100, and for the uneven wear resistance in the center region, the reciprocals of the measurement values are expressed as index values with Comparative Example 11 being assigned the index value of 100. Larger index values indicate superior uneven wear resistance.

Rolling Resistance:

The test tires were each mounted on a wheel with a 16×6.5 J rim size and then on a drum testing machine. The rolling resistance was measured in accordance with ISO 25280 at an air pressure of 210 kPa and a load of 4.82 kN. The evaluation results are expressed as index values using the reciprocal of the measurement values, with Comparative Example 11 being assigned the index value of 100. Higher index values indicate lower rolling resistance.

TABLE 2

| | | Conventional Example 11 | Comparative Example 11 | Example 11 | Example 12 |
|---|---|---|---|---|---|
| Inclination angle $\alpha$ of belt cord at tire center position (°) | | 26 | 26 | 26 | 26 |
| Inclination angle $\beta$ of belt cord at belt end position (°) | | 26 | 18 | 18 | 18 |
| Outer belt layer | Boundary position between large-angle region and transition region (mm) | — | 45 | 45 | 45 |
| | Boundary position between transition region and small-angle region (mm) | — | 53 | 53 | 53 |
| | Outer end position (mm) | 80 | 80 | 80 | 80 |
| Inner belt layer | Boundary position between large-angle region and transition region (mm) | — | 45 | 45 | 45 |
| | Boundary position between transition region and small-angle region (mm) | — | 53 | 53 | 53 |
| | Outer end position (mm) | 85 | 85 | 85 | 85 |
| Belt reinforcing layer structure | | Uniform | Uniform | FIG. 9 | FIG. 11 |
| Cord count of belt reinforcing layer in inner region (cords/50 mm) | | 50 | 50 | 50 | 50 |
| Cord count of belt reinforcing layer in outer region (cords/50 mm) | | 50 | 50 | 25 | 50 |
| Cord material of belt reinforcing layer in inner region | | Nylon | Nylon | Nylon | Nylon/aramid |
| Cord material of belt reinforcing layer in outer region | | Nylon | Nylon | Nylon | Nylon |
| Inclination angle of band cord at tire center position (°) | | 0 | 0 | 0 | 0 |
| Inclination angle of band cord at reinforcing layer end position (°) | | 0 | 0 | 0 | 0 |
| Rectangular ratio of contact patch shape (%) | | 90 | 75 | 85 | 90 |
| Uneven wear resistance in shoulder region (index value) | | 100 | 120 | 120 | 120 |
| Uneven wear resistance in center region (index value) | | 125 | 100 | 115 | 125 |
| Rolling resistance (index value) | | 120 | 100 | 115 | 120 |

| | | Example 13 | Example 14 | Example 15 | Example 16 | Example 17 |
|---|---|---|---|---|---|---|
| Inclination angle $\alpha$ of belt cord at tire center position (°) | | 26 | 26 | 26 | 26 | 26 |
| Inclination angle $\beta$ of belt cord at belt end position (°) | | 18 | 18 | 18 | 24.5 | 23 |
| Outer belt layer | Boundary position between large-angle region and transition region (mm) | 45 | 45 | 45 | 45 | 45 |
| | Boundary position between transition region and small-angle region (mm) | 53 | 53 | 53 | 53 | 53 |
| | Outer end position (mm) | 80 | 80 | 80 | 80 | 80 |
| Inner belt layer | Boundary position between large-angle region and transition region (mm) | 45 | 45 | 45 | 45 | 45 |
| | Boundary position between transition region and small-angle region (mm) | 53 | 53 | 53 | 53 | 53 |
| | Outer end position (mm) | 85 | 85 | 85 | 85 | 85 |
| Belt reinforcing layer structure | | FIG. 10 | FIG. 12 | FIG. 10 | FIG. 9 | FIG. 9 |
| Cord count of belt reinforcing layer in inner region (cords/50 mm) | | 50 | 50 | 50 | 50 | 50 |
| Cord count of belt reinforcing layer in outer region (cords/50 mm) | | 40 | 50 | 40 | 25 | 25 |

TABLE 2-continued

| | | | | | |
|---|---|---|---|---|---|
| Cord material of belt reinforcing layer in inner region | Nylon/aramid | Nylon | Nylon | Nylon | Nylon |
| Cord material of belt reinforcing layer in outer region | Nylon | Nylon | Nylon | Nylon | Nylon |
| Inclination angle of band cord at tire center position (°) | 0 | 0 | 0 | 0 | 0 |
| Inclination angle of band cord at reinforcing layer end position (°) | 0 | 20 | 0 | 0 | 0 |
| Rectangular ratio of contact patch shape (%) | 93 | 85 | 80 | 90 | 88 |
| Uneven wear resistance in shoulder region (index value) | 120 | 120 | 120 | 110 | 115 |
| Uneven wear resistance in center region (index value) | 130 | 120 | 115 | 125 | 120 |
| Rolling resistance (index value) | 125 | 115 | 110 | 120 | 120 |

As can be seen from Table 2, the tires of Examples 11 to 17 have excellent uneven wear resistance in the shoulder region compared to Conventional Example 11. Also, the tires of Examples 11 to 17 have excellent uneven wear resistance in the center region and good rolling resistance compared to Comparative Example 11.

The invention claimed is:

1. A pneumatic tire, comprising:
   a carcass layer mounted between a pair of bead portions; and
   two belt layers disposed outward of the carcass layer in a tire radial direction in a tread portion, the two belt layers each comprising a plurality of belt cords inclined with respect to a tire circumferential direction, the plurality of belt cords of different of the belt layers being arranged in a criss-cross manner;
   in at least one of the two belt layers, an inclination angle α of the plurality of belt cords with respect to the tire circumferential direction at a tire center position and an inclination angle β of the plurality of belt cords with respect to the tire circumferential direction at a belt end position satisfying a relationship $15° \leq \beta < \alpha \leq 35°$; and
   a maximum ground contact length L1 and a ground contact length L2 satisfying a relationship $0.8 \leq L2/L1 \leq 1.0$, where, with the pneumatic tire inflated to an air pressure of 240 kPa, loaded with a load 75% of standards-specified maximum load capacity, and brought into contact with a ground, L1 is the maximum ground contact length in the tire circumferential direction, W1 is a maximum ground contact width in a tire lateral direction, and L2 is the ground contact length in the tire circumferential direction at a position 40% of the maximum ground contact width W1 from the tire center position outward in the tire lateral direction; wherein
   the at least one belt layer comprises a centrally located large-angle region where an inclination angle of the plurality of belt cords is in a range α±1° and a small-angle region on a shoulder side where an inclination angle of the plurality of belt cords is in a range β±1°; and
   a width of the large-angle region is ½ or greater of an entire width of the at least one belt layer, and a width of the small-angle region is ⅛ or greater of the entire width of the at least one belt layer.

2. The pneumatic tire according to claim 1, wherein a difference between the inclination angle α and the inclination angle β is 3° or greater.

3. The pneumatic tire according to claim 1, further comprising
   a belt reinforcing layer disposed outward of the at least one belt layer in the tire radial direction, the belt reinforcing layer being disposed covering the large-angle region of the at least one belt layer.

4. The pneumatic tire according to claim 3, wherein the belt reinforcing layer comprises at least two belt reinforcing layers.

5. The pneumatic tire according to claim 3, wherein
   a plurality of main grooves extending in the tire circumferential direction are formed in the tread portion, the plurality of main grooves comprising at least one center main groove and a pair of shoulder main grooves located outward on either side of the center main groove; and
   the belt reinforcing layer extends outward in the tire lateral direction beyond the pair of shoulder main grooves, and a distance d in the tire lateral direction from an end position of the belt reinforcing layer to a corresponding shoulder main groove is 50% or greater of an opening width D of the corresponding shoulder main groove.

6. The pneumatic tire according to claim 3, wherein
   the at least one belt layer comprises a transition region between the large-angle region and the small-angle region, the transition region including a change in angle of the plurality of belt cords; and
   the belt reinforcing layer is disposed covering the large-angle region and the transition region of the at least one belt layer.

7. The pneumatic tire according to claim 1, wherein the two belt layers each comprise the large-angle region and the small-angle region.

8. The pneumatic tire according to claim 7, wherein
   the two belt layers each comprise a transition region between the large-angle region and the small-angle region, the transition region including a change in angle of the plurality of belt cords; and
   the transition region of the belt layer located inward and the transition region of the belt layer located outward are offset from one another in the tire lateral direction.

9. The pneumatic tire according to claim 1, wherein the pneumatic tire is a tire for a passenger vehicle with an aspect ratio of 65% or less.

10. The pneumatic tire according to claim 1, further comprising
    a belt reinforcing layer disposed outward of the at least one belt layer in the tire radial direction, covering the at least one belt layer; and
    a rigidity of the belt reinforcing layer in the tire circumferential direction per unit width is higher in an inner region than an outer region in the tire lateral direction.

11. The pneumatic tire according to claim 10, wherein a difference between the inclination angle α and the inclination angle β is 3° or greater.

12. The pneumatic tire according to claim 10, wherein in the belt reinforcing layer, a cord count of band cords per unit width is greater in the inner region than in the outer region in the tire lateral direction.

13. The pneumatic tire according to claim 10, wherein, in the belt reinforcing layer, band cords disposed in the inner region in the tire lateral direction have a higher rigidity than band cords disposed in the outer region in the tire lateral direction.

14. The pneumatic tire according to claim 10, wherein
   in the belt reinforcing layer, an inclination angle of band cords with respect to the tire circumferential direction ranges from 0° to 30°; and
   the inclination angle of the band cords with respect to the tire circumferential direction gradually increases from inward to outward in the tire lateral direction.

15. The pneumatic tire according to claim 10, wherein the pneumatic tire is a tire for a passenger vehicle with an aspect ratio of 65% or less.

\* \* \* \* \*